April 21, 1936. H. C. EDWARDS 2,038,027
VIBRATION DAMPER FOR CRANKSHAFTS
Filed Nov. 10, 1931
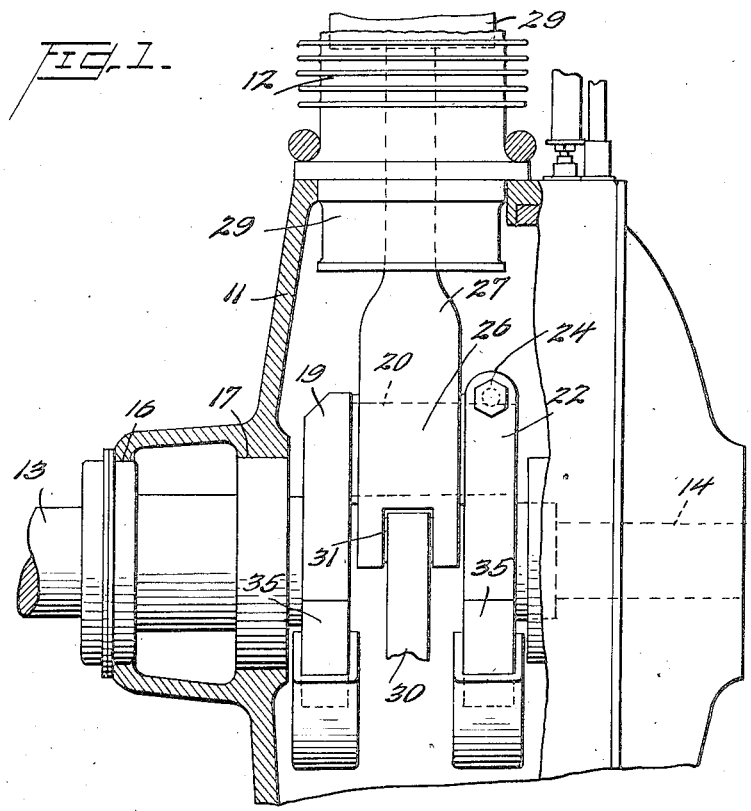
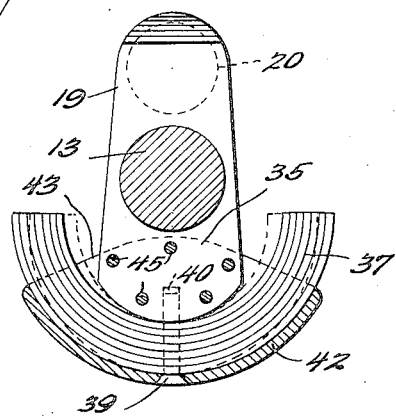
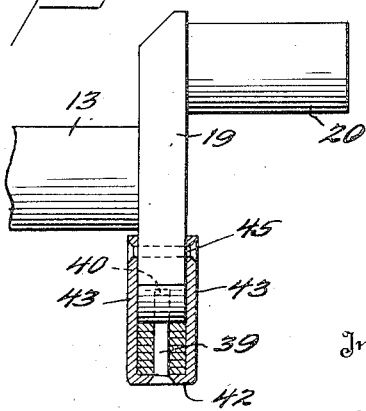
Inventor
Herbert C. Edwards
By Watson, Coit, Morse & Grindle
Attorneys Patented Apr. 21, 1936

2,038,027

UNITED STATES PATENT OFFICE 2,038,027

VIBRATION DAMPER FOR CRANK SHAFTS

Herbert C. Edwards, Detroit, Mich., assignor to Packard Motor Car Company, Detroit, Mich., a corporation of Michigan Application November 10, 1931, Serial No. 574,210

15 Claims. (Cl. 74—604)

This invention relates to means for damping vibrations in rotating bodies and is particularly concerned with the damping of torsional vibrations in engine crankshafts, such as are induced by the periodic impulses applied to the shaft to rotate the same.

It is an object of the invention to provide a vibration damper which can be cheaply manufactured and readily attached to a shaft of ordinary construction.

Many of the vibration dampers heretofore constructed employ a freely movable inertia member and means for frictionally resisting relative movement between the inertia member and the shaft to absorb the energy of vibrations producing such relative movement. The present invention contemplates the provision of an elastic or flexible inertia means of such nature that flexing thereof in response to shaft vibration results in the development of friction internally of the inertia member, and thus the necessity of providing a separate friction means for resisting relative movement of the inertia member and the shaft is avoided.

It is a feature of the invention that the inertia member is constituted by a leaf spring or a leaf spring assembly, one portion thereof being secured to the shaft and another portion being free to vibrate and thus absorb the energy of the shaft vibrations.

It is a more specific object of the invention to provide a device comprising a leaf spring assembly and means for securing the central portion of the assembly rigidly to an arm on the shaft whereby the free ends of the spring assembly may partake of movement with respect to the shaft, the energy of such movement being absorbed by friction between the respective leaves of the assembly.

A further object of the invention is the provision of means for neutralizing centrifugal force and torsional vibration in a crankshaft comprising a counter-weighting arm rigid with the shaft and an inertia member consisting of a leaf spring assembly rigidly secured to the arm and having portions thereof free to flex in response to shaft vibrations.

Further objects and features of the invention will be apparent from the following description taken in connection with the accompanying drawing, in which:

Figure 1 is a longitudinal section through a portion of an internal combustion engine, embodying principles of the invention;

Figure 2 is a sectional view on the line 2—2 of Figure 1; and

Figure 3 is a sectional view on the line 3—3 of Figure 2.

It will be understood that the arrangement shown in the drawing is intended as illustrative of the principles underlying the present invention and that various changes and alterations in this construction may be made without departing from the spirit of the invention. Thus, while various component parts of the damper and their relationship are set forth in detail herein to facilitate an understanding of the invention, no limitation in the scope of the invention is thereby intended.

Referring now to the drawing, it will be observed that the damper has been shown as applied to an internal combustion engine of the well-known multi-cylinder radial type having a crank case 11 on which are mounted a number of radially disposed cylinders, one of which is indicated at 12. In the embodiment illustrated, the crankshaft is of the built-up type having a forwardly extending portion 13 and an aligned rearwardly extending portion 14, each of these portions being journaled in suitable bearings such as shown at 16 and 17 in the crank case 11. The forwardly extending portion 13 of the crankshaft includes an integral crank arm 19 with a crank pin 20 thereon. The rearwardly extending portion 14 of the crankshaft is likewise provided with an integral crank arm 22 which is secured at one end to the crank pin 20 in any suitable manner. For instance, the arm 22 may be split adjacent the end to embrace the pin 20 and clamped by means of a bolt 24 the arms 19 and 22 and the pin 20 forming the crank of the shaft.

Journaled on the crank pin 20 is the hub portion 26 of a master connecting rod 27, the other end of which is connected to a piston 29 in one of the engine cylinders 12. Some of the pistons (not shown) in the other cylinders of the engine are connected by means of link rods, such as 30, to link pins 31 pivotally mounted in the hub portion 26 of the connecting rod 27 and arranged in circular spaced relation therein around the crank pin 20 in the well-known manner so that the pressures of all the pistons 29 are communicated to and drive the crankshaft 13, 14.

The unbalanced rotating masses of the crankshaft system, which include the crank, the master rod and its hub, and the link rods and associated parts, are adapted to be counterbalanced by suitable counter-weights which preferably comprise arms 35 disposed opposite each crank arm and forming integral extensions thereof.

It will be understood that the arrangement thus far described is selected for the purpose of illustrating the invention only and that the details of the engine and crankshaft structure shown herein do not constitute an essential feature of the present invention.

Referring now more specifically to Figures 2 and 3, it will be observed that the inertia member is illustrated as consisting of a leaf spring assembly 37 which is secured to one end of the counterbalancing arm 35 by means of a bolt 39 threaded in a recess 40 in the end of the arm. It will be understood that as many of these inertia members may be applied to any given crankshaft as are required, it being advisable in the crankshaft shown herein to provide one of these inertia members on each of the counterbalancing arms 35.

In order to firmly secure the leaf spring assembly in position on the arm, a spring bracket 42 is provided, this bracket having a curved spring supporting portion normally engaging the outer leaf of the spring assembly and being U-shaped in cross section so that the flanged portions 43 forming each side thereof may fit over the arm 35 and engage the lateral surfaces of the arm. The bracket is preferably secured in position on the arm by a plurality of rivets 45.

In assembling the device to the arm 35, the bolts 39 are passed through the bracket 40, the spring assembly 37, and threaded into the recess 40 in the arm, and the parts are maintained clamped in this position while the rivets 45 are applied. It will be noted that the spring assembly 37 is curved so that the free ends thereof extend toward the crankshaft axis and that clearance is provided between the arm and these free ends so that the latter may move with respect to the bracket and the shaft.

In the operation of the device, the spring assembly normally occupies the position shown in full lines in Figure 2 of the drawing, but, owing to the vibrations induced in the shaft, the inertia of the free ends of the spring assembly causes them to flex alternately into the positions shown in dotted lines in that figure. The spring assembly develops considerable internal friction by reason of this flexure, the separate spring leaves moving rapidly past one another, and thus the energy of vibration of the shaft which causes the springs to flex is dissipated in the form of heat. In this manner the building up of torsional vibrations to an undesirable extent is effectively prevented.

Having thus described the invention, what is claimed as new and desired to be secured by Letters Patent is:—

1. In a vibration damper for shafts of the type employing an inertia element capable of displacement with respect to the shaft in response to shaft vibration, the combination with an arm on the shaft, of a leaf spring assembly secured to said arm with the ends of the assembly free to move in response to shaft vibrations, and constituting the sole inertia element of the damper.

2. In a vibration damper for shafts of the type employing inertia means capable of displacement with respect to the shaft in response to shaft vibrations, the combination with supporting means on the shaft, of a plurality of leaf spring assemblies carried by said supporting means with the ends of the assemblies free to move in response to shaft vibrations, said leaf spring assemblies constituting the sole inertia means of the damper.

3. Means for neutralizing centrifugal force and torsional vibration in a crankshaft comprising a counterweight rigidly carried by said shaft, and a leaf spring assembly secured intermediate the ends thereof to said counterweight with the ends free to flex in response to shaft vibrations.

4. In a vibration damper for shafts, the combination with an arm on the shaft, of a leaf spring assembly having the central portion thereof secured to the arm and the end portions thereof disposed on either side of the arm and directed inwardly toward the shaft.

5. In a vibration damper for shafts, a bracket secured to the shaft and inertia means carried by said bracket and consisting of a leaf spring assembly having a free unloaded vibrating portion.

6. In a vibration damper for shafts, a leaf spring device having one portion thereof connected to the shaft and having a free unloaded end portion vibrating in response to shaft vibrations.

7. In a vibration damper for shafts, a leaf spring device having a centrally disposed portion connected to the shaft and free unloaded end portions movable in response to shaft vibrations.

8. In a vibration damper for shafts, an inertia member consisting wholly of a resilient metallic device carried by the shaft for rotation therewith and deformable in response to shaft vibrations.

9. A vibration damper for shafts consisting wholly of a flexible inertia metallic member developing internal friction when flexed and means for connecting said inertia member to the shaft for rotation therewith and for flexing movement with respect thereto in response to shaft vibrations.

10. In apparatus for damping vibrations, the combination with a shaft, of a counterbalancing mass rigidly secured to said shaft, and a resilient flexible inertia member carried by said mass for flexure when the shaft is rotated.

11. Means for damping vibrations in a shaft comprising an arm rigidly secured to the shaft, a bracket surrounding the end of the arm and secured thereto, and a leaf spring assembly clamped between said bracket and said arm for flexure when the shaft is rotated.

12. A vibration damper for shafts consisting wholly of a flexible metallic inertia member secured to the shaft.

13. A vibration damper for shafts consisting wholly of a leaf spring assembly secured to the shaft.

14. A vibration damper for shafts consisting wholly of a flexible metallic inertia member having one portion thereof secured to the shaft and the remainder thereof free to vibrate in response to shaft vibrations.

15. A vibration damper for shafts consisting wholly of a flexible metallic inertia member developing internal friction when flexed and having one portion thereof fixed to the shaft.

HERBERT C. EDWARDS.